(12) United States Patent
Nakajima et al.

(10) Patent No.: US 12,072,195 B2
(45) Date of Patent: Aug. 27, 2024

(54) DISPATCHED VEHICLE EXTRACTION SERVER, DISPATCHED VEHICLE EXTRACTION DEVICE, DISPATCHED VEHICLE EXTRACTION METHOD, AND DISPATCHED VEHICLE DISPLAY TERMINAL

(71) Applicant: Nissan Motor Co., Ltd., Yokohama (JP)

(72) Inventors: Tatsuyuki Nakajima, Kanagawa (JP); Satoshi Kawai, Kanagawa (JP); Yohei Kaneko, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 224 days.

(21) Appl. No.: 17/598,940

(22) PCT Filed: Mar. 29, 2019

(86) PCT No.: PCT/IB2019/000406
§ 371 (c)(1),
(2) Date: Sep. 28, 2021

(87) PCT Pub. No.: WO2020/201798
PCT Pub. Date: Oct. 8, 2020

(65) Prior Publication Data
US 2022/0178709 A1  Jun. 9, 2022

(51) Int. Cl.
*G01C 21/34* (2006.01)
(52) U.S. Cl.
CPC ..... *G01C 21/3438* (2013.01); *G01C 21/3461* (2013.01); *G01C 21/3484* (2013.01)

(58) Field of Classification Search
CPC ............ G01C 21/3438; G01C 21/3461; G01C 21/3484
(Continued)

(56) References Cited

U.S. PATENT DOCUMENTS

2018/0328748 A1\* 11/2018 Chachra ................ G06Q 50/30

FOREIGN PATENT DOCUMENTS

| JP | 2005-216155 A | 8/2005 |
| JP | 2013-134641 A | 7/2013 |

(Continued)

*Primary Examiner* — Marc Burgess
*Assistant Examiner* — John D Holman
(74) *Attorney, Agent, or Firm* — Global IP Counselors, LLP (57) ABSTRACT

A dispatched vehicle extraction server, a dispatched vehicle extraction device, and a dispatched vehicle extraction method perform: acquiring a dispatching request, a user position and a vehicle position of a dispatched vehicle at the time of the dispatching request; calculating a time the user spends moving from the user position to a meeting site of the dispatched vehicle, calculating a time the user spends waiting, calculating a total time that would be spent by the user from when the user makes the dispatching request until the user arrives at an intended location by boarding the dispatched vehicle; extracting the dispatched vehicle that satisfies constraints relating to the total time and the time would be spent waiting according to the user attribute information at the proposed meeting sites; and outputting a combination of each of the proposed meeting sites and the dispatched vehicle.

10 Claims, 5 Drawing Sheets

(58) Field of Classification Search
USPC .......................................................... 701/533
See application file for complete search history.

(56) References Cited

FOREIGN PATENT DOCUMENTS

| JP | 2014-66605 A | 4/2014 | | |
|---|---|---|---|---|
| JP | 2018-163578 A | 10/2018 | | |
| JP | 2018-206177 A | 12/2018 | | |
| JP | 2018206177 | * 12/2018 | ............. | G06F 17/30 |
| WO | 2018/230676 A1 | 12/2018 | | |

* cited by examiner

DISPATCHED VEHICLE EXTRACTION SERVER, DISPATCHED VEHICLE EXTRACTION DEVICE, DISPATCHED VEHICLE EXTRACTION METHOD, AND DISPATCHED VEHICLE DISPLAY TERMINAL

CROSS-REFERENCE TO RELATED APPLICATIONS

This application is a U.S. national stage application of International Application No. PCT/IB2019/000406, filed on Mar. 29, 2019.

BACKGROUND

Technical Field

The present invention relates to a dispatched vehicle extraction server, dispatched vehicle extraction means, a dispatched vehicle extraction method, and a dispatched-vehicle-display terminal.

Background Information

Japanese Laid-Open Patent Application No. 2013-134641 (Patent Document 1) proposes a dispatched-vehicle call system in which, when a user makes a reservation for ride dispatching, it is possible to display, on a user terminal, information about dispatched vehicles positioned within a prescribed range from the position of the user, and to call a dispatched vehicle selected by the user due to the user performing an operation to call the dispatched vehicle.

SUMMARY

However, in the feature disclosed in Patent Document 1, when dispatched vehicles are displayed on the user terminal, the dispatched vehicles within a prescribed range from the position of the user are displayed uniformly. Accordingly, there have been cases where dispatched vehicles unsuitable for the user are displayed, without consideration for, e.g., cases where the user is moving, or for a time the user spends waiting until boarding the dispatched vehicle.

The present invention is designed in view of this problem, it being an object of the present invention to provide a dispatched vehicle extraction server, dispatched vehicle extraction means, a dispatched vehicle extraction method, and a dispatched-vehicle-display terminal with which it is possible to improve convenience for a user using a ride dispatching system, in consideration of movement of the user and a time the user spends waiting until boarding a dispatched vehicle.

In order to achieve the abovementioned object, a dispatched vehicle extraction server, dispatched vehicle extraction means, a dispatched vehicle extraction method, and a dispatched-vehicle-display terminal according to one aspect of the present invention: calculate a time a user spends moving from the user position to a meeting site at which the user arranges to meet with the dispatched vehicle, a time the user spends waiting that is obtained by subtracting the movement time from a time lasting from when the user makes the dispatching request until the user boards the dispatched vehicle, and a total time spent by the user from when the user makes the dispatching request until the user arrives at an intended location by boarding the dispatched vehicle; and extract a dispatched vehicle based on the total time and the time that would be spent waiting.

According to the present invention, it is possible to improve convenience for a user using a ride dispatching system, in consideration of movement of the user and a time the user spends waiting until boarding a dispatched vehicle.

BRIEF DESCRIPTION OF THE DRAWINGS

Referring now to the attached drawings which form a part of this original disclosure.

DETAILED DESCRIPTION OF EMBODIMENTS

Embodiments of the present invention are described in detail below with reference to the accompanying drawings. Redundant descriptions in which the same reference symbols are associated with the same elements are omitted.

Configuration of Ride Dispatching System

Figure 1:
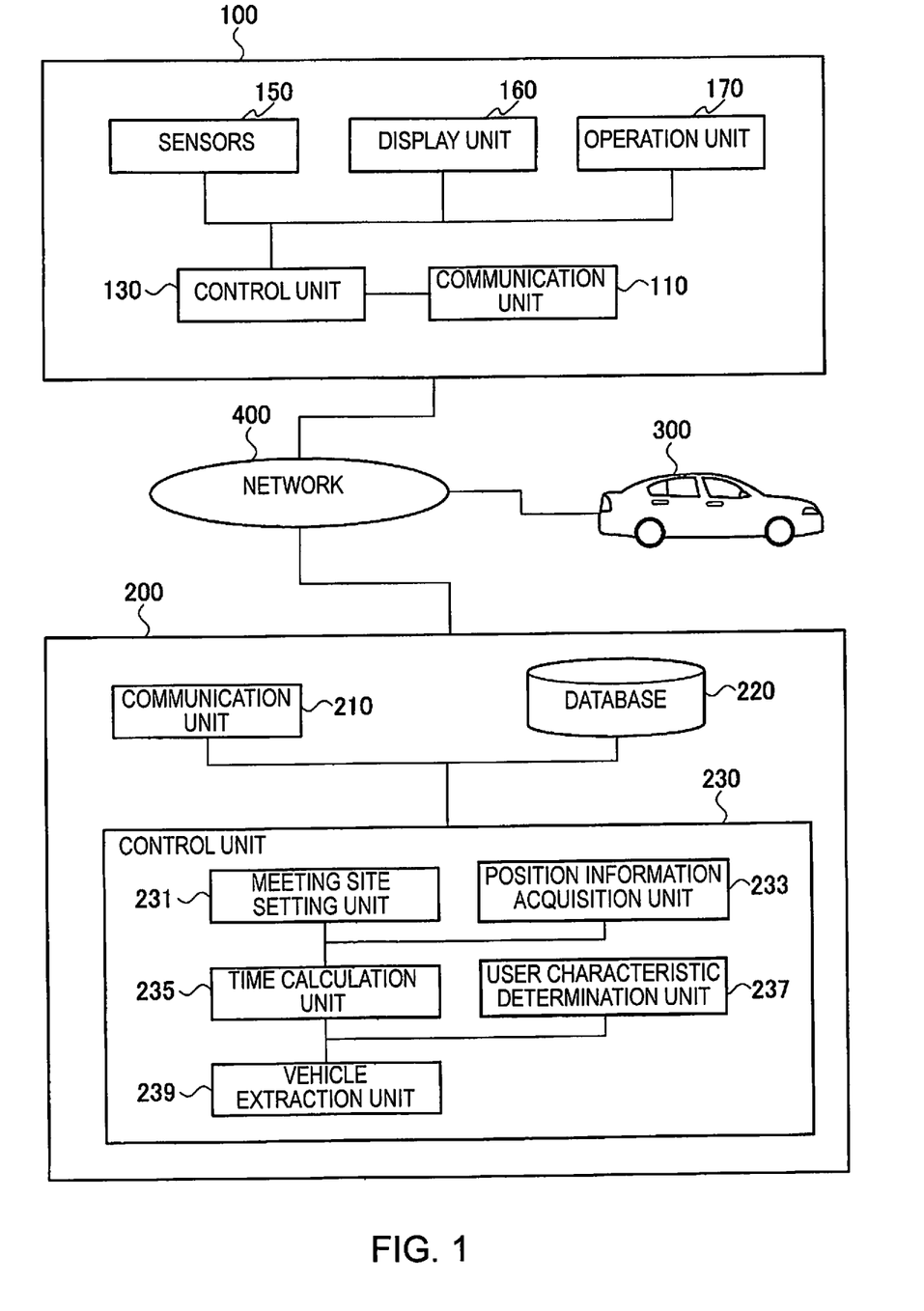
FIG. 1 is a block diagram showing a configuration of a ride dispatching system that includes a dispatched vehicle extraction server and a dispatched-vehicle-display terminal according to one embodiment of the present invention.

FIG. 1 is a block diagram showing a configuration of a ride dispatching system that includes a dispatched vehicle extraction server and a dispatched-vehicle-display terminal according to one embodiment of the present invention. As shown in FIG. 1, the ride dispatching system is provided with a dispatched-vehicle-display terminal 100 (operation terminal), a dispatched vehicle extraction server 200, and a dispatched vehicle 300 that are connected to each other by a wireless or priority network 400.

The dispatched-vehicle-display terminal 100 accepts a dispatching request from a user and transmits the accepted dispatching request. Examples of the dispatched-vehicle-display terminal 100 include portable terminals that are routinely used by the user (smartphone, tablet, etc.).

The dispatched vehicle extraction server 200 acquires information about the dispatching request by the user and about the dispatched vehicle 300, and extracts, based on the acquired information, a combination (recommended combination) of a meeting site and a dispatched vehicle 300 that conforms to the dispatching request. The dispatched vehicle extraction server 200 also outputs information about the extracted combination of the meeting site and the dispatched vehicle 300. The "recommended combination" is a combination of a recommended meeting site and a recommended dispatched vehicle extracted from among combinations of meeting sites and dispatched vehicles 300.

The "meeting site" is a location at which the dispatched vehicle 300 can be stopped and the user can board the dispatched vehicle 300, and moreover is a site in map data that is registered in advance in the ride dispatching system. The dispatched vehicle 300 is a conveyance provided with means for traveling to an intended location designated by the user (destination of the user). Examples of the dispatched vehicle 300 include autonomous vehicles. Other examples of the dispatched vehicle 300 include manned/unmanned taxis, buses, trucks, and various other movement means. A plurality of meeting sites and a plurality of dispatched vehicles are registered in the ride dispatching system.

Examples of the network 400 include the Internet. A mobile communication function such as 4G/LTE or 5G may also be used as the network 400.

A management server (not shown in FIG. 1) of a servicer (e.g., DeNA®, UBER®, or another ride dispatching service provision company) may be connected to the network 400 and may constitute part of the ride dispatching system.

In this case, the dispatching request transmitted from the dispatched-vehicle-display terminal 100 may be processed by the management server of the servicer, and then the processed dispatching request may be transmitted to the dispatched vehicle extraction server 200. In addition, the information about the dispatched vehicle 300 may be processed by the management server of the servicer, and then the processed information about the dispatched vehicle 300 may be transmitted to the dispatched vehicle extraction server 200.

Furthermore, the information about the dispatched vehicle 300 outputted from the dispatched vehicle extraction server 200 may be processed by the management server of the servicer, and then the processed information may be transmitted to the dispatched-vehicle-display terminal 100.

In order to simplify the description below, the management server of the servicer is omitted, and the dispatched-vehicle-display terminal 100 is configured to be capable of two-way communication with the dispatched vehicle extraction server 200 via the network 400; furthermore, the dispatched vehicle 300 is configured to be capable of two-way communication with the dispatched vehicle extraction server 200 via the network 400.

Configuration of Dispatched-Vehicle-Display Terminal

The dispatched-vehicle-display terminal 100 is described next. As shown in FIG. 1, the dispatched-vehicle-display terminal 100 according to the present embodiment is provided with sensors 150, a display unit 160, an operation unit 170, a communication unit 110, and a control unit 130 (controller).

The sensors 150 are formed from a plurality of sensor groups and include a position detection sensor that acquires position information about the dispatched-vehicle-display terminal 100. For example, the position detection sensor is a global positioning system (GPS) or other type of sensor that measures absolute position.

The sensors 150 may also include environment sensors that acquire environment information related to the environment in which the dispatched-vehicle-display terminal 100 is present. For example, the environment sensors may be temperature sensors, humidity sensors, vibration sensors, acceleration sensors, microphones, etc.

The display unit 160 displays information about the dispatched vehicle 300 provided by the ride dispatching system and information related to the meeting site at which the user arranges to meet with the dispatched vehicle 300. The information about the dispatched vehicle 300 and the information related to the meeting site are acquired by the communication unit 110 (described later) from the dispatched vehicle extraction server 200 via the network 400. The display unit 160 may also display route information required in order to reach the meeting site and guidance information for guiding movement of the user to the meeting site.

The operation unit 170 accepts operations performed by the user that correspond to various commands from the user to the ride dispatching system. For example, the operation unit 170 may be an input interface provided with a plurality of buttons, or may be a touch panel provided with a touch interface.

More specifically, the display unit 160 displays an icon represented by a picture or a symbol so as to enable operation of the icon by the user, and the operation unit 170 accepts an operation by the user performed by the user touching, dragging, or otherwise manipulating the displayed icon.

The communication unit 110 transmits information to, and receives information from, the network 400. The communication unit 110 stores the information acquired from the network 400 in a memory, etc. (not shown), and outputs prescribed information such as the dispatching request or environment information to the network 400. For example, the communication unit 110 may be an onboard device provided with a 4G/LTE mobile communication function, or may be an onboard device provided with a Wifi communication function.

The control unit 130 is connected to the sensors 150, the display unit 160, the operation unit 170, and the communication unit 110. Information from the sensors 150, the operation unit 170, and the communication unit 110 is inputted to the control unit 130, and information directed to the display unit 160 and the communication unit 110 is outputted from the control unit 130.

The control unit 130 is a general-purpose microcomputer provided with a central processing unit (CPU), a memory, and an input/output unit. A computer program (dispatched-vehicle-display program) for the purpose of functioning as part of the dispatched-vehicle-display terminal 100 is installed in the control unit 130. By executing the computer program, the control unit 130 controls the display unit 160 and the communication unit 110.

Various information processes provided to the control unit 130 may be executed by software or by dedicated hardware.

In particular, as an information process performed by the control unit 130, the control unit 130 acquires the dispatching request from the user based on an operation performed by the user on the operation unit 170. For example, a designation of a planned intended location sought by the user using the dispatched vehicle may be included in the dispatching request. Designations of the number of possible passengers, the specifications, the type, etc., of the dispatched vehicle may also be included in the dispatching request.

User attribute information may also be included in the dispatching request. Information about the user's preferences, age, gender, occupational category, or physical characteristics, as well as the occurrence of an event before or after the dispatching request and the classification of such an event, may be included in the user attribute information. For example, when the dispatched-vehicle-display terminal 100 is a portable terminal that is routinely used by the user (smartphone, tablet, etc.), an application serving as the dispatched-vehicle-display program may acquire these items of attribute information by coordinating with a social networking service (SNS) or another cloud service.

Configuration of Dispatched Vehicle Extraction Server

The dispatched vehicle extraction server 200 is described next. As shown in FIG. 1, the dispatched vehicle extraction server 200 according to the present embodiment is provided with a communication unit 210 (communication means), a database 220, and a control unit 230 (controller).

The communication unit 210 transmits and receives information to and from the network 400. The communication unit 210 acquires, from the network 400, prescribed information such as the dispatching request transmitted from the dispatched-vehicle-display terminal 100 and vehicle information (e.g., position information about the dispatched vehicle, remaining fuel capacity, or status information indicating whether the dispatched vehicle is currently providing a ride dispatching service) transmitted from the dispatched vehicle 300, and records the acquired information in a database 220.

The database 220 stores information acquired by the communication unit 210. The database 220 may also store past dispatching requests from the user, a usage history of the ride dispatching system, the frequency of use, etc. The database 220 may also store a variety of parameter tables for estimating the user characteristics of the user.

The control unit 230 (controller, one example of a processing unit) is a general-purpose microcomputer provided with a central processing unit (CPU), a memory, and an input/output unit. A computer program (dispatched-vehicle-display program) for the purpose of functioning as part of the dispatched vehicle extraction server is installed in the control unit 230. By executing the computer program, the control unit 230 functions as a plurality of information processing circuits (231, 233, 235, 237, 239).

An example is described here in which the plurality of information processing circuits (231, 233, 235, 237, 239) provided to the control unit 230 are executed by software. However, the information processing circuits (231, 233, 235, 237, 239) can also be configured by preparing dedicated hardware for executing various information processes described below. The plurality of information processing circuits (231, 233, 235, 237, 239) may also be configured from individual units of hardware.

The control unit 230 is provided with a meeting site setting unit 231, a position information acquisition unit 233, a time calculation unit 235, a user characteristic determination unit 237, and a vehicle extraction unit 239 as the plurality of information processing circuits (231, 233, 235, 237, 239).

The position information acquisition unit 233 acquires the user position and the vehicle position of a dispatched vehicle 300 at the time of a dispatching request via the communication unit 210.

The meeting site setting unit 231 (meeting site setting means) selects a meeting site that is within a prescribed distance range from the user position, among meeting sites registered in the ride dispatching system, as a subject for computation performed by the time calculation unit 235 based on the user position acquired by the position information acquisition unit 233. The meeting site setting unit 231 also selects a dispatched vehicle that is within a prescribed distance range from the user position, among dispatched vehicles registered in the ride dispatching system, as a subject for computation performed by the time calculation unit 235 based on the user position and the vehicle position of the dispatched vehicle 300 acquired by the position information acquisition unit 233.

The reason all of the meeting sites registered in the ride dispatching system are not employed as subjects for computation is that it is unrealistic to have the user move from the user position to a meeting site that is too far away. The reason all of the dispatched vehicles registered in the ride dispatching system are not employed as subjects for computation is that dispatched vehicles that are too far away from the user position or the meeting position would be expected to take a long time to arrive at the meeting site and are realistically unsuitable for dispatching. Furthermore, limiting the subjects for computation also makes it possible to reduce total calculation costs.

However, the present invention can be realized by the meeting site setting unit 231 even if all of the registered meeting sites are employed as subjects for calculation without limitation.

The time calculation unit 235 (time calculation means) calculates a time the user spends moving from the user position to the meeting site, and a time the user spends waiting obtained by subtracting the time that would be spent moving from a time lasting from when the dispatching request is made until the user boards the dispatched vehicle, by employing the meeting site and the dispatched vehicle for which computations are to be performed. The time calculation unit 235 also calculates the time the user spends moving, the time the user spends waiting, and a total time for each combination of a meeting site and a dispatched vehicle. The time the user spends moving is the period of time taken when the user moves from the user position to the meeting site without stopping.

For example, there is described below a case where one given meeting site and one given dispatched vehicle are selected from among the meeting sites for which computations are to be performed, and the time the user spends moving, the time the user spends waiting, and the total time are computed for the selected combination of meeting site and dispatched vehicle.

The time required for the dispatched vehicle to move to the meeting site is designated as a "vehicle-side time spent moving TC," and the time required for the user to move to the meeting site is designated as a "user-side time spent moving TP" (time the user spends moving). The vehicle-side time spent moving TC is calculated based on road conditions and the orientation of the dispatched vehicle relative to the advancement direction of the road, in addition to the meeting site and the vehicle position of the dispatched vehicle. The user-side time spent moving TP is calculated based on the meeting site and the user position.

A "pre-usage time TS," which is the time from when the dispatching request is made until the user boards the dispatched vehicle, is computed as shown in formula (1), where the maximum value function "Max(x,y)" is defined as "Max(x,y)=x" in cases when "x≥y," and is defined as "Max(x,y) y" in cases when "x<y."

$$TS = \mathrm{Max}(TC, TP) \qquad \text{Formula (1):}$$

In order to derive formula (1), it is assumed that the time required until the user boards the dispatched vehicle after the user and the dispatched vehicle have met at the meeting site is negligibly shorter than the vehicle-side time spent moving TC and the user-side time spent moving TP.

Thus, a "user-side time spent waiting TW" (time the user spends waiting), which is the time during which the user waits, is computed as shown in formula (2).

$$TW = TS - TP \qquad \text{Formula (2):}$$

Therefore, establishing the meeting site, the vehicle position of the dispatched vehicle, and the user position makes it possible to calculate the user-side time spent waiting TW (time the user spends waiting).

In addition to the time during which the user waits at the meeting site, the time during which the user waits at the user position upon having made the dispatching request and the time in a case where the user pauses in the course of moving from the user position to the meeting site are also included in the time the user spends waiting.

When TC>TP (e.g., when the user arrives at the meeting site before the dispatched vehicle), TW=TC−TP>0.

When TC≤TP (e.g., when the user arrives at the meeting site after the dispatched vehicle, or when the dispatched vehicle and the user arrive at the same time), TW=0.

Thus, the user-side time spent waiting TW can be computed based on formula (3).

$$TW=\text{Max}(TC-TP,0) \quad \text{Formula (3):}$$

According to formula (3), because it is sufficient to only assess whether "TC−TP" is positive or negative in the evaluation of the maximum value function "Max(x,y)," it is possible to reduce computation costs to a greater extent than when the user-side time spent waiting TW is calculated using formulas (1) and (2).

A "total time TA," which is the time from when the dispatching request is made until the user arrives at the intended location by boarding the dispatched vehicle, is computed as shown in formula (4) (a mathematically transformed version of formula (2) is used partway through), where the "onboard time TR" is defined as the time during which the user boards the dispatched vehicle from the meeting site to the intended location.

$$TA=TS+TR$$

$$=TP+TW+TR \quad \text{Formula (4):}$$

The onboard time TR is calculated based on the meeting site and the intended location. Therefore, establishing the meeting site, the vehicle position of the dispatched vehicle, the user position, and the intended location makes it possible to calculate the total time TA.

As described above, the time calculation unit 235 calculates the time the user spends moving, the time the user spends waiting, and the total time for each combination of a meeting site and a dispatched vehicle.

The user characteristic determination unit 237 (user characteristic determination means) determines the user characteristics based on the user attribute information. Specifically, the user characteristic determination unit 237 estimates, based on the user attribute information, constraints for total time and time spent waiting required by the user who created the dispatching request.

Figure 2:
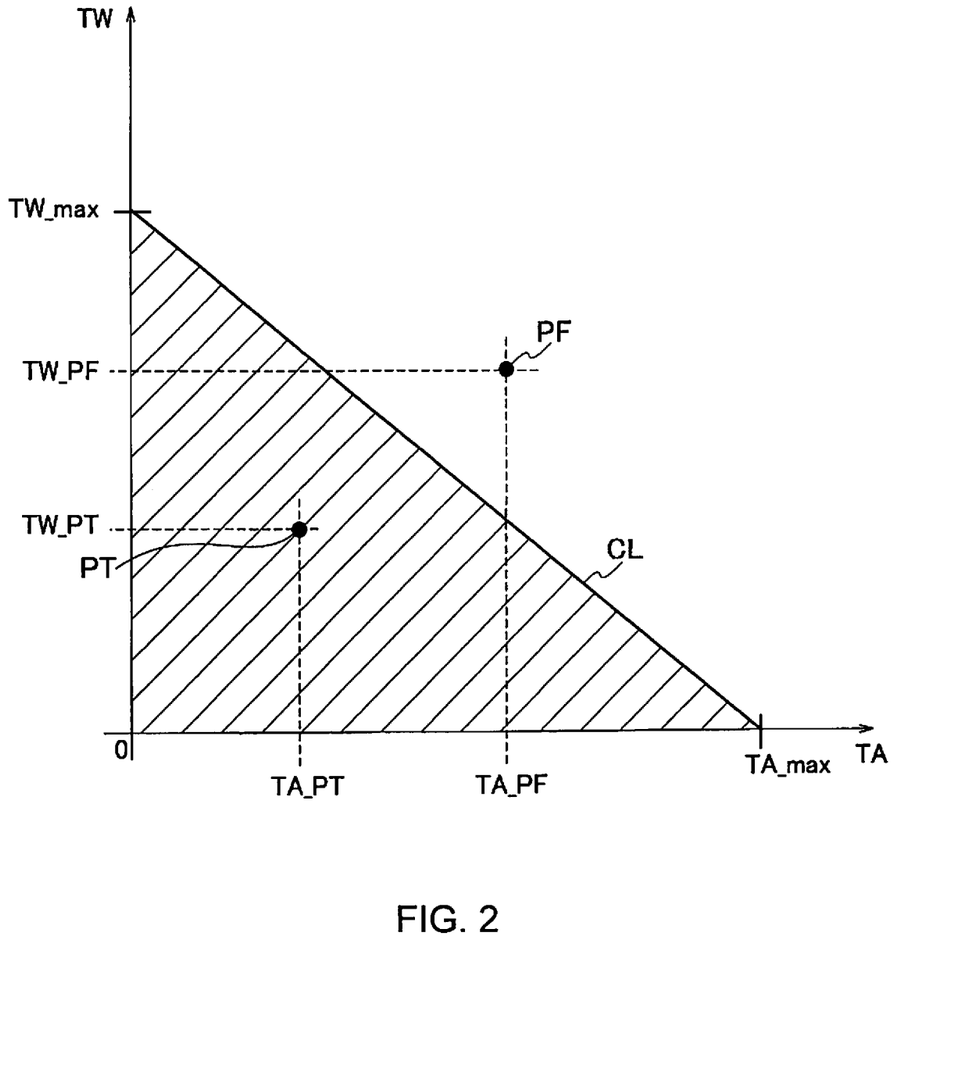
FIG. 2 is a graph showing user characteristics that pertain to a user using the ride dispatching system.

FIG. 2 is a graph showing user characteristics that pertain to the user using the ride dispatching system. Constraints for total time and time spent waiting are represented by a region marked with diagonal lines in a coordinate system having two coordinate axes, i.e., the total time TA and the user-side time spent waiting TW, as shown in FIG. 2.

The diagonal-line region in FIG. 2 is presented as a set of (TA, TW) that satisfy all of formulas (5-1), (5-2), and (5-3) below.

$$TA/TA\_\text{max}+TW/TW\_\text{max} \leq 1 \quad \text{Formula (5-1):}$$

$$TW \geq 0 \quad \text{Formula (5-2):}$$

$$TA \geq 0 \quad \text{Formula (5-3):}$$

The value "TA_max" represents the maximum value of the total time TA, and the value "TW_max" represents the maximum value of the user-side time spent waiting TW.

A calculated result is plotted in the graph in FIG. 2 as a point PF having coordinates (TA_PF,TW_PF), where "TA_PF" is the user total time calculated for a given combination of a meeting site and a dispatched vehicle, and "TW_PF" is the calculated time the user spends waiting. In this case, because the point PF is not within the diagonal-line region, it can be said that the combination of a meeting site and a dispatched vehicle that corresponds to the point PF does not satisfy the user characteristics.

Another calculated result is plotted in the graph in FIG. 2 as a point PT having coordinates (TA_PT,TW_PT), where "TA_PT" is the user total time calculated for a given combination of a meeting site and a dispatched vehicle, and "TW_PF" is the calculated time the user spends waiting. In this case, because the point PT is within the diagonal-line region, it can be said that the combination of a meeting site and a dispatched vehicle that corresponds to the point PT satisfies the user characteristics.

Specifically, when the user total time and the time the user spends waiting calculated for a combination of a meeting site and a dispatched vehicle satisfy all of formulas (5-1), (5-2), and (5-3), it can be said that the combination of a meeting site and a dispatched vehicle satisfies the user characteristics. In all other circumstances, it can be said that the combination does not satisfy the user characteristics.

User requirements with respect to the ride dispatching system vary depending on the user. For example, the user requirements may include "a requirement such that it is permissible to wait until the dispatched vehicle arrives because there is spare time" ("requirement to lengthen time spent waiting"), or the opposite, i.e., "a requirement such that the time until arrival at the intended location should be short because there is no spare time" ("requirement to shorten total time").

Because the total time will tend to increase if the time that would be spent waiting increases, these two requirements contradict each other. Thus, the user requirements with respect to the ride dispatching system include a relationship involving a tradeoff between the user total time and the time the user spends waiting.

Therefore the user characteristic determination unit 237 adjusts the value "TW_max" and the value "TA_max" based on the user attribute information, thereby estimating or correcting the user characteristics used in extraction of the meeting site and the dispatched vehicle in the ride dispatching system.

A boundary CL in a first quadrant among the boundaries of the diagonal-line region in FIG. 2 is defined by a linear function, but such an arrangement is not provided by way of limitation.

For example, the boundary in the first quadrant may be defined by a variety of monotonically decreasing functions in which the user-side time spent waiting TW decreases in association with increases in the total time TA. In this case, the user characteristic determination unit 237 adjusts parameters for defining the shape of the monotonically decreasing function based on the user attribute information.

Additionally, the user characteristic determination unit 237 may estimate or correct the user characteristics used in extraction of the meeting site and the dispatched vehicle in the ride dispatching system based on environment information (information about environment in which user is present) or an event classification (classification of event before or after dispatching request).

The user characteristic determination unit 237 may also determine the user characteristics based on an explicit command from the user.

The vehicle extraction unit 239 (extraction means) extracts recommended combinations that conform to the dispatching request from among the combinations of meeting sites and dispatched vehicles based on the total time and the time the user spends waiting calculated by the time calculation unit 235.

Specifically, combinations of meeting sites and dispatched vehicles that satisfy the user characteristics estimated by the user characteristic determination unit 237, i.e., constraints with respect to the total time and the time that would be spent waiting are extracted as the recommended combinations.

Figure 3A:
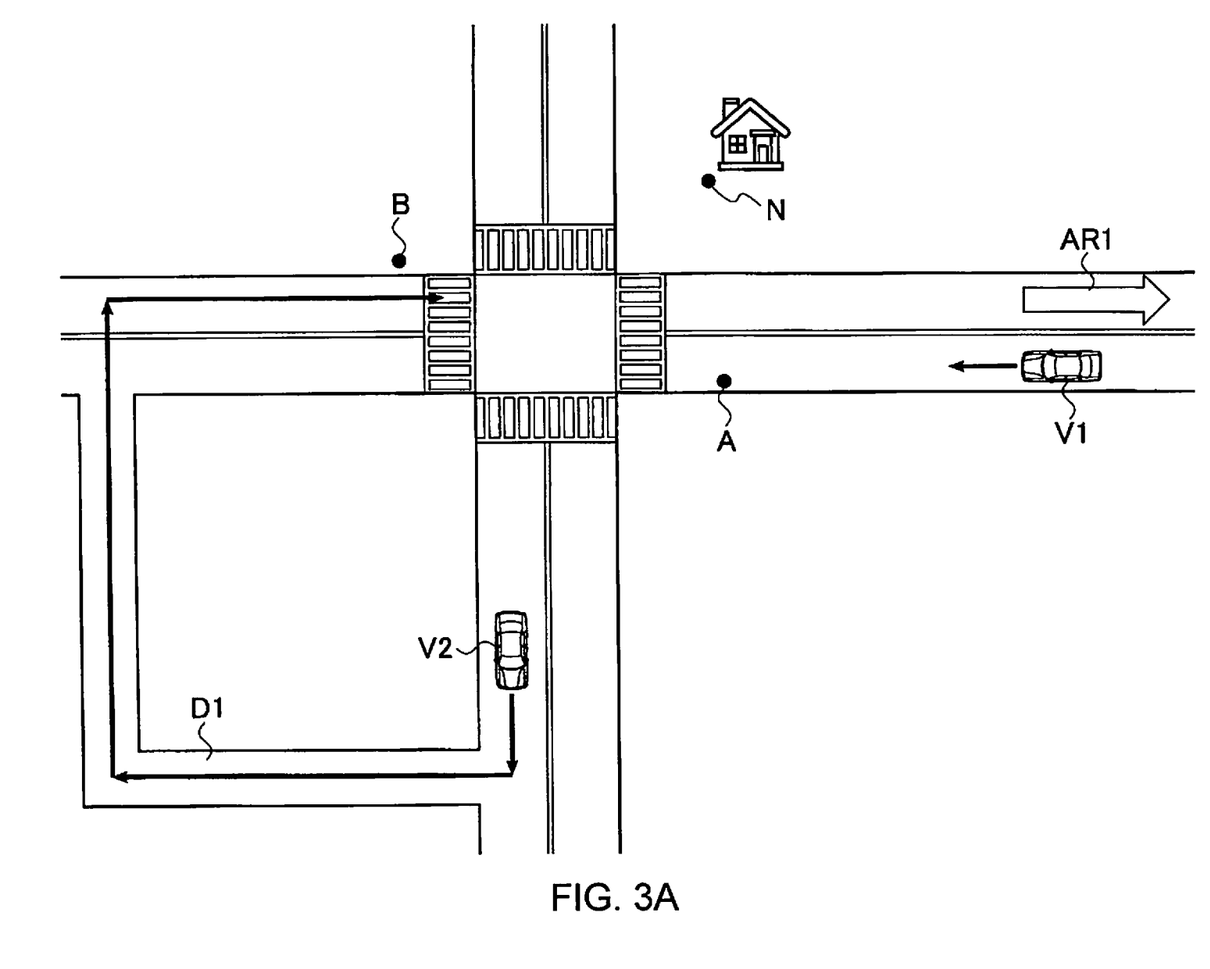
FIG. 3A is a diagram showing one example of a user position, the positions of dispatched vehicles, and meeting sites.
Figure 3B:
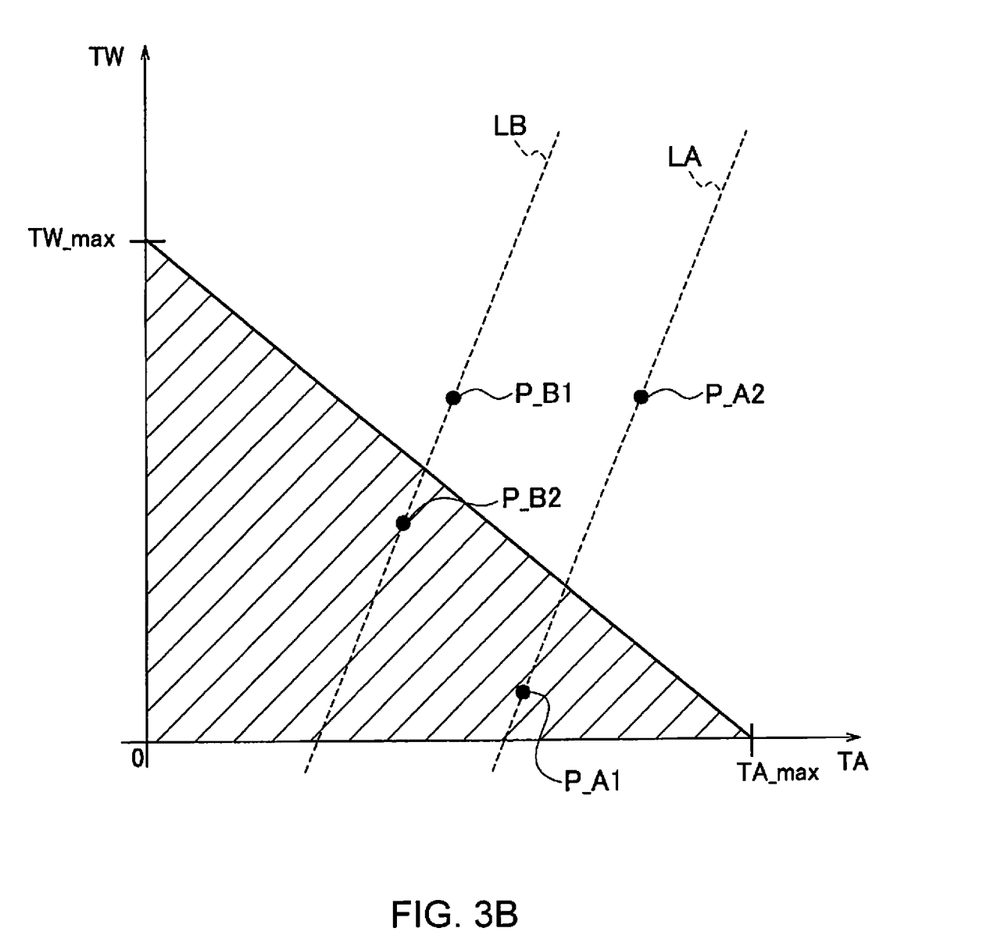
FIG. 3B is a diagram in which a time the user spends waiting and a total time constituting a set are plotted on a graph showing user characteristics, the total time being calculated in the positional relationship shown in FIG. 3A.

An example of a process performed by the vehicle extraction unit 239 is described using FIGS. 3A and 3B. FIG. 3A is a diagram showing one example of a user position, the positions of dispatched vehicles, and meeting sites. FIG. 3B is a diagram in which a time the user spends waiting and a total time constituting a set are plotted on a graph showing user characteristics, the total time being calculated in the positional relationship shown in FIG. 3A.

There is considered below a case where a meeting site A, a meeting site B, a dispatched vehicle V1, and a dispatched vehicle V2 are registered in the ride dispatching system, as shown in FIG. 3A.

The user position at the time of the dispatching request is indicated by site N. The total time from the site N is shorter at the meeting site B than at the meeting site A. Specifically, because the meeting site A is positioned on a lane oriented in the opposite direction from an intended-location direction AR1, the total time for meeting site A tends to be longer, and because the meeting site B is positioned on a lane oriented in the same direction as the intended-location direction AR1, the total time for the meeting site B tends to be shorter.

The positional relationship between the dispatched vehicle V1 and the dispatched vehicle V2 at the time of the dispatching request is set as shown in FIG. 3A. The times at which the dispatched vehicles arrive at the meeting sites differ due to the positional relationship between the meeting sites and the dispatched vehicles. The time the dispatched vehicles spend moving to the meeting site A is longer for the dispatched vehicle V2 than for the dispatched vehicle V1, and the time the dispatched vehicles spend moving to the meeting site B is longer for the dispatched vehicle V1 than for the dispatched vehicle V2.

In the example shown in FIG. 3A, because there are two meeting sites serving as subjects for computation and two dispatched vehicles serving as subjects for computation, there are four combinations of meeting sites and dispatched vehicles (2×2=4). Therefore, the time is calculated by the time calculation unit 235 for each of the four combinations of meeting sites and dispatched vehicles.

Based on the result of calculation, four points (point P_A1, point P_A2, point P_B1, and point P_B2) are plotted on a graph showing the user characteristics, as shown in FIG. 3B.

In FIG. 3B, the index notation clarifies which point corresponds to which combination of a meeting site and a dispatched vehicle (for example, the index notation for point P_A1 is A1, meaning that this point corresponds to the combination of the meeting site A and the dispatched vehicle A1).

The sloping of a line LA by which the point P_A1 and the point P_A2 are connected, and of a line LB by which the point P_B1 and the point P_B2 are connected, originates from the fact that the total time TA increases commensurately with increases in the user-side time spent waiting TW, as indicated by formula (4) described above.

The vehicle extraction unit 239 assesses whether each of the plotted points is included in the diagonal-line region showing the user characteristics, i.e., whether the calculated set of total time and time spent waiting satisfies the constraints.

The vehicle extraction unit 239 also extracts, as recommended combinations, a combination of a meeting site and a dispatched vehicle that corresponds to a set of a total time and a time spent waiting satisfying the constraints. However, the vehicle extraction unit 239 does not extract combinations of meeting sites and dispatched vehicles that correspond to sets of total times and times spent waiting not satisfying the constraints as recommended combinations.

In the example shown in FIG. 3B, the combinations of meeting sites and dispatched vehicles that correspond to points P_A1 and P_B2 are extracted as recommended combinations. Therefore, two cases are extracted, i.e., a case involving meeting with the dispatched vehicle V1 at the meeting site A and a case involving meeting with the dispatched vehicle V2 at the meeting site B.

The combinations of meeting sites and dispatched vehicles extracted by the vehicle extraction unit 239 can vary in accordance with the user characteristics estimated by the user characteristic determination unit 237.

Additionally, the vehicle extraction unit 239 may apply scores (degrees of recommendation) to each recommended combination based on the user characteristics. For example, within the diagonal-line region representing the user characteristics as shown in FIG. 2, applying a higher score to a combination in correspondence with greater proximity to the origin point makes it possible to compare the recommended combinations.

The recommended combinations extracted by the vehicle extraction unit 239 are outputted to outside of the dispatched vehicle extraction server 200 via the communication unit 210. The outputted recommended combinations are acquired by the communication unit 110 of the dispatched-vehicle-display terminal 100 and are displayed on the display unit 160.

Although the dispatched vehicle extraction server is configured as described above, it is also permissible for, e.g., the time calculation unit 235, the user characteristic determination unit 237, and the vehicle extraction unit 239 to be provided to the control unit 130 of the dispatched-vehicle-display terminal 100, and for the recommended combinations to be extracted in the dispatched-vehicle-display terminal 100.

Additionally, user characteristics may be determined in the dispatched-vehicle-display terminal 100, and the recommended combinations may be extracted in the dispatched-vehicle-display terminal 100 from among combinations of meeting sites and dispatched vehicles transmitted from the dispatched vehicle extraction server 200.

Sequence of Processes for Extracting Dispatched Vehicle

Figure 4:
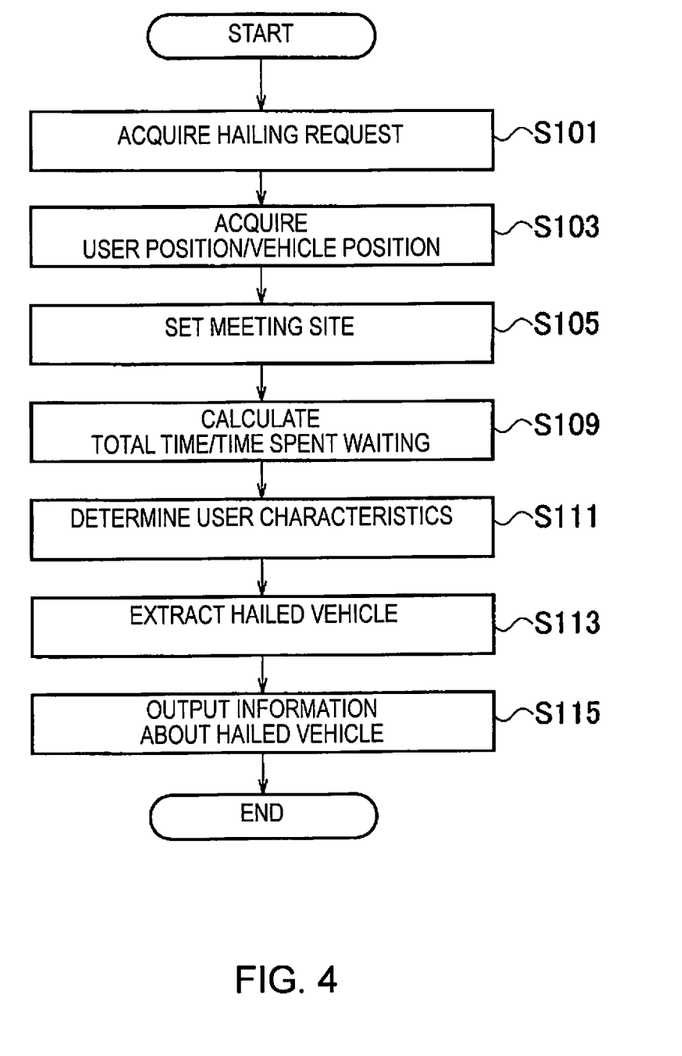
FIG. 4 is a flowchart showing a sequence of processes for extracting a dispatched vehicle according to one embodiment of the present invention.

A sequence of processes for extracting a dispatched vehicle according to the present embodiment is described next with reference to the flowchart in FIG. 4. The processes for extracting a dispatched vehicle shown in FIG. 4 are started together with the start of operation of the ride dispatching system and are repeatedly executed while the ride dispatching system is operating.

In step S101, the dispatched vehicle extraction server 200 acquires, via the communication unit 210, the dispatching request transmitted from the dispatched-vehicle-display terminal 100.

In step S103, the position information acquisition unit 233 acquires, via the communication unit 210, the user position and the vehicle position of the dispatched vehicle 300 at the time of the dispatching request.

In step S105, the meeting site setting unit 231 selects a meeting site to serve as a subject for computation by the time calculation unit 235 from among the meeting sites registered in the ride dispatching system. The meeting site setting unit 231 also selects a dispatched vehicle to serve as a subject for computation by the time calculation unit 235 from among the dispatched vehicles 300 registered in the ride dispatching system.

In step S109, the time calculation unit 235 calculates a time the user spends moving from the user position to the meeting site, a time the user spends waiting obtained by subtracting the time that would be spent moving from a time lasting from when the dispatching request is made until the user boards the dispatched vehicle, and a total time from when the dispatching request is made until the user arrives at the intended location by boarding the dispatched vehicle.

In step S111, the user characteristic determination unit 237 determines the user characteristics based on the user attribute information. At such time, the user characteristic determination unit 237 estimates or corrects the user characteristics used in extraction of the meeting site and the dispatched vehicle in the ride dispatching system, based on the user attribute information and the environment information.

In step S113, the vehicle extraction unit 239 extracts recommended combinations that conform to the dispatching request from among the combinations of meeting sites and dispatched vehicles based on the time the user spends moving and the time the user spends waiting calculated by the time calculation unit 235.

In step S115, the recommended combinations extracted by the vehicle extraction unit 239 are outputted via the communication unit 210 to outside of the dispatched vehicle extraction server 200.

Example of Estimation/Correction of User Characteristics

An example of the estimation/correction of user characteristics performed by the user characteristic determination unit 237 is described below.

The user requirements with respect to the ride dispatching system vary depending on the user. Therefore, it is necessary to estimate/correct the user characteristics used in extraction of the meeting site and the dispatched vehicle in the ride dispatching system in accordance with the user. The user requirements also vary depending on environment in which the user is present, as well as the existence of plans before or after the dispatching request and the type of such plans. Therefore, it is necessary to estimate/correct the user characteristics in accordance with the environment information and any event classification.

Therefore, the user characteristic determination unit 237 estimates/corrects the user characteristics based on the "user attribute information," the "environment information," and any "event classification."

Estimation/correction of user characteristics based on the "user attribute information" is described first.

For example, students, housewives, elderly persons, children, etc., tend to prefer "a requirement such that it is permissible to wait until the dispatched vehicle arrives because there is spare time" ("requirement to lengthen time spent waiting"). Meanwhile, office workers, executives, etc., tend to prefer "a requirement such that it is permissible to wait until the dispatched vehicle arrives only if the time until arrival at the intended location is short because there is no spare time" ("requirement to shorten total time").

Therefore, the user characteristic determination unit 237 estimates whether the user has a tendency toward a personality type preferring "a requirement to lengthen time spent waiting" or toward a personality type preferring "a requirement to shorten total time" based on the user's preferences, age, gender, occupational category, physical characteristics, etc.

More specifically, in cases where information about a "profession" can be acquired in the user attributed information, the user is estimated to have a personality type preferring "a requirement to lengthen time spent waiting" if the user is a student, a housewife, or unemployed; however, the user is estimated to have a personality type preferring "a requirement to shorten total time" if the user is an office worker or an executive.

In cases where the user is assessed to be "impatient" based on the user attribute information, the user is estimated to have a personality type preferring "a requirement to shorten total time." However, in cases where the user is assessed to be "leisurely" (lazy, has a poor sense of direction, etc.), the user is estimated to have a personality type preferring "a requirement to lengthen time spent waiting." The assessment as to being "impatient" or "leisurely" may be made according to a user's reservation history or dispatching history, a survey provided to the user in advance, etc.

Thus, the user characteristic determination unit 237 estimates whether the user has a tendency toward a personality type preferring "a requirement to lengthen time spent waiting" or toward a personality type preferring "a requirement to shorten total time."

As pertains to the user characteristic determination unit 237, in cases where the user has a personality type preferring "a requirement to shorten total time," the user characteristic determination unit 237 adjusts the value "TA_max" for establishing the boundary CL in FIG. 2 so as to be less than a default value.

Conversely, as pertains to the user characteristic determination unit 237, in cases where the user has a personality type preferring "a requirement to lengthen time spent waiting," the user characteristic determination unit 237 adjusts the value "TW_max" for establishing the boundary CL in FIG. 2 so as to be greater than a default value.

The comparative extent to which the user characteristic determination unit 237 adjusts the default value for the boundary CL may be changed in accordance with the strength of a requirement level.

Thus, by adjusting the value "TW_max" and the value "TA_max" based on the user attribute information, the user characteristic determination unit 237 estimates or corrects the user characteristics used in extraction of the meeting site and the dispatched vehicle in the ride dispatching system.

Estimation/correction of user characteristics based on the "environment information" is described second.

For example, in the case of warm and sunny weather, the user will not feel much burden in waiting for the dispatched vehicle to arrive. However, in cases where the air temperature is different from temperatures at which people are comfortable, cases where it is raining or snowing, or cases of strong winds, the user will tend to feel a great burden in waiting for the dispatched vehicle to arrive.

Thus, the user characteristic determination unit 237 estimates whether the user has "a requirement to shorten total time" or "a requirement to shorten time spent waiting" based on the environment information.

In the example described above, the user is estimated to have "a requirement to shorten time spent waiting" in cases where the air temperature is different from temperatures at which people are comfortable, cases where it is raining or snowing, or cases of strong winds.

The user characteristic determination unit 237 adjusts the boundary CL in the same manner as in the estimation/correction of the user characteristics based on the "user attribute information."

Estimation/correction of user characteristics based on the "event classification" is described third.

For example, there may be cases where it is possible to estimate the tendencies of the user after usage of the ride dispatching service from user calendar information or the place of departure/intended location of the user.

Specifically, plans for time after the user has used the ride dispatching service are identified as "live performance," "beauty parlor," "medical examination at hospital," airplane flight," "business golf," etc. In this case, it is thought that the user will act as though it is impermissible to be late for these plans, and therefore the user is estimated to prefer "a requirement to shorten total time."

However, in cases where the plan for after usage of the ride dispatching service is "returning home," or where there is no plan in particular, the user is estimated to prefer "a requirement to lengthen time spent waiting."

Thus, an event classification is assessed from the user calendar information or the place of departure/intended location of the user, and the user characteristic determination unit 237 estimates/corrects the user characteristics according to a tendency of the user that corresponds to the event classification. The user characteristic determination unit 237 adjusts the boundary CL in the same manner as in the estimation/correction of the user characteristics based on the "user attribute information."

Various variations in the estimation/correction of the user characteristics by the user characteristic determination unit 237 are conceivable, and the example described above is not provided by way of limitation.

Effect of Embodiment

As described in detail above, in the dispatched vehicle extraction server, the dispatched vehicle extraction means, the dispatched vehicle extraction method, and the dispatched-vehicle-display terminal according to the present embodiment: a dispatching request is acquired from an operation terminal on which a user performs a request operation; the user position and the vehicle position of a dispatched vehicle at the time of the dispatching request are acquired; a time the user spends moving from the user position to a meeting site at which the user arranges to meet with the dispatched vehicle, a time the user spends waiting obtained by subtracting the time the user spends moving from a time lasting from when the user makes the dispatching request until the user boards the dispatched vehicle, and a user total time from when the user makes the dispatching request until the user arrives at the intended location by boarding the dispatched vehicle are calculated; and a dispatched vehicle is extracted based on the total time and the time that would be spent waiting.

Specifically, because the dispatched vehicle is extracted based on the time the user spends waiting and the total time from when the dispatching request is made until the user arrives at the intended location by boarding the dispatched vehicle, it is possible to improve convenience for a user using the ride dispatching system. In particular, even when the user position and the vehicle position of the dispatched vehicle change dynamically, it is possible to propose to the user a dispatched vehicle that conforms to the dispatching request in accordance with the dynamically changed circumstances.

Furthermore, because a dispatched vehicle can be extracted in consideration of the relationship involving the tradeoff between the total time and the time the user spends waiting in the requirements from the user, it is possible to improve convenience for a user using the ride dispatching system.

Additionally, in the dispatched vehicle extraction server, the dispatched vehicle extraction means, the dispatched vehicle extraction method, and the dispatched-vehicle-display terminal according to the present embodiment, the time that would be spent waiting and the total time may be calculated for each combination of a meeting site and a dispatched vehicle, and a recommended combination may be extracted among the combinations based on the time that would be spent waiting and the total time. This makes it possible, even when the user position and the vehicle position of the dispatched vehicle changes dynamically, to propose to the user a meeting site and a dispatched vehicle that conform to the dispatching request in accordance with the dynamically changed circumstances. In addition, it is possible to extract a meeting site and a dispatched vehicle in consideration of the relationship involving the tradeoff between the total time and the time the user spends waiting in the requirements from the user, and to improve convenience for a user using the ride dispatching system.

Furthermore, in the dispatched vehicle extraction server, the dispatched vehicle extraction means, the dispatched vehicle extraction method, and the dispatched-vehicle-display terminal according to the present embodiment, constraints relating to the total time and the time that would be spent waiting may be estimated based on the attribute information, and combinations that satisfy the constraints may be extracted as recommended combinations. This makes it possible to allow user characteristics, which vary depending on the user, to be reflected in the results of extracting a meeting site and a dispatched vehicle, and to provide a ride dispatching service that is customized for each user.

In addition, in the dispatched vehicle extraction server, the dispatched vehicle extraction means, the dispatched vehicle extraction method, and the dispatched-vehicle-display terminal according to the present embodiment, environment information about the surroundings of the user position may be acquired, and the constraints may be corrected based on the environment information. This makes it possible to allow changes in the environment surrounding the user to be reflected in the results of extracting a meeting site and a dispatched vehicle, and to provide a ride dispatching service that is customized for each user.

Furthermore, in the dispatched vehicle extraction server, the dispatched vehicle extraction means, the dispatched vehicle extraction method, and the dispatched-vehicle-display terminal according to the present embodiment, information about the recommended combinations may be outputted and displayed. This makes it possible to present a meeting site and a dispatched vehicle in conformance with the dispatching request not only to the user but also to the servicer providing the ride dispatching service, and to improve convenience for a user using the ride dispatching system.

In addition, in the dispatched vehicle extraction server, the dispatched vehicle extraction means, the dispatched vehicle extraction method, and the dispatched-vehicle-display terminal according to the present embodiment, when the value obtained by subtracting the time that would be spent moving from the time required for the dispatched vehicle to move from the vehicle position to the meeting site is equal to or greater than 0, said value may be employed as the time that would be spent waiting. This makes it possible to calculate the time the user spends waiting using a simple method and to reduce computation costs.

Furthermore, in the dispatched vehicle extraction server, the dispatched vehicle extraction means, the dispatched vehicle extraction method, and the dispatched-vehicle-display terminal according to the present embodiment, the user position may be acquired from an operation terminal. This makes it possible to present to the user a dispatched vehicle that conforms to the dispatching request based on the accurate position of the user.

In addition, in the dispatched vehicle extraction server, the dispatched vehicle extraction means, the dispatched vehicle extraction method, and the dispatched-vehicle-display terminal according to the present embodiment, a portable terminal may be used as the operation terminal. The user position can be accurately evaluated based on position information about the portable terminal carried by the user, and a dispatched vehicle that conforms to the dispatching request can be proposed to the user based on the accurate position of the user.

The particulars of the present invention were described above according to an embodiment, but such disclosures are not provided by way of limitation to the present invention; it would be obvious to a person skilled in the art that various modifications and improvements can be made. The statements and drawings forming part of these disclosures should not be interpreted to limit the present invention. A variety of alternative embodiments, examples, and practical features should be obvious to a person skilled in the art from these disclosures.

As shall be apparent, the present invention includes various embodiments, etc., that are not described above. Therefore, the technical scope of the present invention is established only by the valid invention-defining matter according to the claims from the explanations given above.

The functions indicated in the embodiment described above can be realized by one or a plurality of processing circuits. The one or plurality of processing circuits include a processing device including an electrical circuit, or another programmed processing device. The processing device includes application-specific integrated circuits (ASIC) or prior-art circuit components that are arranged so as to execute the functions described in the embodiment.

The invention claimed is:

1. A ride dispatching system comprising:
a dispatched vehicle extraction server including a database and a server controller including a processor; and
an operation terminal including a display and a terminal controller,
the server controller being configured to
acquire a dispatching request including user attribute information from the operation terminal on which a user performs a request operation, the dispatching request including an intended location to which the user seeks to travel,
acquire a user position at a time of the dispatching request,
process the dispatching request and acquire one or more proposed meeting sites,
select one or more dispatched vehicles and acquire a vehicle position of the each of the one or more dispatched vehicles, and
calculate, for each combination of one proposed meeting site among the one or more proposed meeting sites and one dispatched vehicle among the one or more dispatched vehicles,
a user moving time the user would spend moving from the user position to the one proposed meeting site,
a user waiting time the user would spend waiting at the one proposed meeting site, the user waiting time being calculated as a difference between the user moving time and a vehicle moving time, the vehicle moving time being a time the one dispatched vehicle would spend moving from the vehicle position to the one proposed meeting site, and
a total time that would be spent by the user from when the user makes the dispatching request until the user arrives at the intended location,
the sever controller being further configured to
extract one or more combinations of a dispatched vehicle among the one or more dispatched vehicles and a proposed meeting site among the one or more proposed meeting sites that satisfy constraints relating to the total time and the user waiting time according to the user attribute information, the constraints being configured such that each of the one or more combinations lies within a region of a graph plotting the total time versus the user waiting time, the region being defined by a total time axis, a user waiting time axis, and a boundary that intersects each of the total time axis and the user waiting time axis, the boundary being defined by a function in which the user waiting time decreases monotonically as the total time increases, and
output the one or more combinations of the proposed meeting site and the dispatched vehicle to the operation terminal,
the operation terminal being configured to display the one or more combinations in response to receiving the output of the one or more combinations from the dispatched vehicle extraction server.

2. The ride dispatching system according to claim 1, wherein
the server controller is further configured to extract a recommended combination from among the one or more combinations based on the total time and the user waiting time.

3. The ride dispatching system according to claim 2, wherein
the server controller is further configured to
process the dispatching request and acquire environment information
pertaining to surroundings of the user position, and correct the constraints based on the environment information.

4. The ride dispatching system according to claim 2, wherein
the server controller is further configured to output information about the recommended combination.

5. The dispatched vehicle extraction server according to claim 1, wherein
the server controller is further configured to
calculate the difference as a value obtained by subtracting the user moving time from the vehicle moving time,
determine whether the value is equal to or greater than 0, and
use the value as the user waiting time upon determining that the value is equal to or greater than 0.

6. The dispatched vehicle extraction server according to claim 1, wherein
the server controller is further configured to acquire the user position from the operation terminal.

7. A dispatched vehicle extraction method comprising:
using a server including a database and a processor and a terminal including a processor and a display to
acquire a dispatching request including user attribute information from an operation terminal on which a user performs a request operation, the dispatching request including an intended location to which the user seeks to travel;
acquire a user position of the user at the time of the dispatching request;
process the dispatching request to acquire a one or more proposed meeting sites;
select one or more dispatched vehicles and acquire a vehicle position of the each of the one or more dispatched vehicles;
for each combination of one proposed meeting site among the one or more proposed meeting sites and one dispatched vehicle among the one or more dispatched vehicles,
calculate a user moving time the user would spend moving from the user position to the one proposed meeting site,
calculate a user waiting time the user spends waiting, the user waiting time being calculated as a difference between the user moving time and a vehicle moving time, the vehicle moving time being a time the one dispatched vehicle would spend moving from the vehicle position to the one proposed meeting site, and
calculate a total time that would be spent by the user from when the user makes the dispatching request until the user arrives at the intended location;
extract one or more combinations of a dispatched vehicle among the one or more dispatched vehicles that satisfies constraints relating to the total time and the user waiting time according to the user attribute information, the constraints being configured such that each of the one or more combinations lies within a region of a graph plotting the total time versus the user waiting time, the region being defined by a total time axis, a user waiting time axis, and a boundary that intersects each of the total time axis and the user waiting time axis, the boundary being defined by a function in which the user waiting time decreases monotonically as the total time increases;
control the display to display the one or more combinations of the proposed meeting site and the dispatched vehicle.

8. A dispatched-vehicle-display terminal comprising:
a controller including a processor;
a display;
a sensor configured to detect a position of the dispatched vehicle display terminal as a user position; and
an operation device configured to be operated by a user to receive a dispatching request of a user, the dispatching request including user attribute information and an intended location to which the user seeks to travel,
the controller being configured to
acquire the user position from the sensor at a time of the dispatching request,
transmit the user position and user attribute information to a dispatched vehicle extraction server,
acquire one or more proposed meeting sites from the dispatched vehicle extraction server,
acquire one or more dispatched vehicles and a vehicle position of the each of the one or more dispatched vehicles from the dispatched vehicle extraction server, and
calculate, for each combination of one proposed meeting site among the one or more proposed meeting sites and one dispatched vehicle among the one or more dispatched vehicles,
a user moving time the user would spend moving from the user position to the one proposed meeting site,
a user waiting time the user would spend waiting at the one proposed meeting site, the user waiting time being calculated as a difference between the user moving time and a vehicle moving time, the vehicle moving time being a time the one dispatched vehicle would spend moving from the vehicle position to the one proposed meeting site, and
a total time spent by the user from when the user makes the dispatching request until the user arrives at the intended location,
the control unit being further configured to
extract one or more combinations of a dispatched vehicle among the one or more dispatched vehicles and a proposed meeting site among the one or more proposed meeting sites that satisfy constraints relating to the total time and the user waiting time according to the user attribute information, the constraints being configured such that each of the one or more combinations lies within a region of a graph plotting the total time versus the user waiting time, the region being defined by a total time axis, a user waiting time axis, and a boundary that intersects each of the total time axis and the user waiting time axis, the boundary being defined by a function in which the user waiting time decreases monotonically as the total time increases, and
cause the display to display the one or more combinations of the proposed meeting site and the dispatched vehicle.

9. The dispatched vehicle display terminal according to claim 8, wherein
the dispatched vehicle display terminal is a portable terminal.

10. A ride dispatching system comprising:
the dispatched-vehicle-display terminal according to claim 8; and
the dispatched vehicle extraction server recited in claim 8, the dispatched vehicle extraction server including a controller having a processor and a database,
the dispatched vehicle extraction server being configured to select the one or more proposed meeting sites and the one or more dispatched vehicles in response to receiving the user position and user attribute information at the time of the dispatching request.

* * * * *